United States Patent [19]

Poisel et al.

[11] Patent Number: 5,037,204
[45] Date of Patent: Aug. 6, 1991

[54] OPTICAL-FIBER GYROSCOPE

[75] Inventors: Hans Poisel, Dachau; Gert Trommer, Munich, both of Fed. Rep. of Germany

[73] Assignee: Messerschmitt-Bölkow-Blohm GmbH, München, Fed. Rep. of Germany

[21] Appl. No.: 575,409

[22] Filed: Aug. 29, 1990

[30] Foreign Application Priority Data

Aug. 30, 1989 [DE] Fed. Rep. of Germany ....... 3928715

[51] Int. Cl.$^5$ ............................................. G01C 19/64
[52] U.S. Cl. .................................................... 356/350
[58] Field of Search .......................................... 356/350

[56] References Cited

U.S. PATENT DOCUMENTS

| 4,440,498 | 4/1984 | Sheem | 356/350 |
| 4,444,503 | 4/1984 | Schiffner | 356/350 |
| 4,491,413 | 1/1985 | Rashleigh | 356/350 |
| 4,529,312 | 7/1985 | Pavlath et al. | 356/350 |
| 4,786,172 | 11/1988 | Zomick | 356/350 |

FOREIGN PATENT DOCUMENTS 3500633 10/1985 Fed. Rep. of Germany .
3805904 8/1989 Fed. Rep. of Germany .

Primary Examiner—Vincent P. McGraw
Attorney, Agent, or Firm—Kenyon & Kenyon

[57] ABSTRACT

An optical-fiber gyroscope of the Sagnac type having an optical fiber coil and a 3×3 coupler comprising three optically coupled fiber optic guides. A first fiber optic guide of the 3×3 coupler is coupled at one end to a first optical radiation source, whose radiation intensity is detected directly by a radiation detector. The two other fiber optic guides of the 3×3 coupler are each coupled to respective ends of an optical fiber coil and, at the other ends of each of the two other fiber optic guides, to respective radiation detectors. The first fiber optic guide of the 3×3 coupler features a second optical radiation source, which is modulated by a frequency which differs from the modulation frequency of the first radiation source.

5 Claims, 2 Drawing Sheets

OPTICAL-FIBER GYROSCOPE

BACKGROUND OF THE INVENTION

The present invention relates to an optical-fiber gyroscope of the Sagnac type having an optical fiber coil and a 3×3 coupler comprising three optically coupled fiber optic guides, whereby a first fiber optic guide of the 3×3 coupler is connected at one end to a first optical radiation source, whose radiation intensity is detected directly by a radiation detector, and the two other fiber optic guides of the 3×3 coupler are connected respectively at one end, to respective ends of the optical fiber coil and, at the other end, to respective radiation detectors.

U.S. Pat. No. 4,440,498 discloses an optical-fiber gyroscope Which can be operated in so-called phase quadrant by using a 3×3 coupler. Also, German Application P38 05 904.5 discloses an optical-fiber gyroscope with which fluctuations in the radiation source, as well as the coupler characteristics, can be detected with the aid of a so-called monitoring diode. See FIG. 1 of the drawings of the present application which shows a diagram of the optical fiber gyroscope according to the German application. With reference to FIG. 1, in the evaluation of signals using diodes 4 and 5, using two monitoring diodes 7 and 6 disposed, respectively, coupled to the radiation source 3, and to the central channel 1 of the 3×3 coupler 2, fluctuations in the radiant power of the light source 3 can be detected and fluctuations in the coupling length of the 3×3 coupler, which, for example, are conditional on the thermal expansion of the coupler, can also be detected. With this device, however, one is only able to detect the common variation in the three coupling lengths among the three wave guides inside the 3×3 coupler, that is $\Delta(K_{12}L) = K_{12}\Delta L$, $\Delta(K_{13}L) = K_{13}\Delta L$ and $\Delta(K_{23}L) = K_{23}\Delta L$ ($K_{ij}$=coupling factor between the fiber optic guides i and j, L =coupling length). Changes, which result from environmental influences such as pressure, acceleration or temperature, in the desired symmetry of the coupling factors $K_{13} = K_{23} = K_{12}$, however, are not considered or determined.

SUMMARY OF THE INVENTION

Therefore, it is the object of the invention to detect deviations in the three coupling factors $K_{ij}$ (i, j = 1, 2, 3), so that errors in the measurement of the rate of rotation can be compensated for.

The above and other objects of the invention are achieved by an optical-fiber gyroscope of the Sagnac type having an optical fiber coil and a 3×3 coupler comprising three optically coupled fiber optic guides, whereby a first fiber optic guide of the 3×3 coupler is coupled at one end to a first optical radiation source, the radiation intensity of the source being detected directly by a radiation detector, the two other fiber optic guides of the 3×3 coupler each being coupled at one end thereof to respective ends of an optical fiber coil and, at the other ends of each of the two fiber optic guides, to respective radiation detectors, the first fiber optic guide of the 3×3 coupler being coupled to a second optical radiation source, which is modulated by a frequency which differs from the modulation frequency of the first radiation source.

The invention begins with the realization that changes in the coupling length L, as well as in the coupling factors $K_{ij}$, can be detected by means of an additional monitoring light source, which is connected to the central channel of the 3×3 coupler. In doing this, the monitoring light source is modulated with a frequency $f_M$ other than that of the actual radiation source. The superimposition of the light signals of the Sagnac interferences, which arrives in the radiation detectors provided for signal evaluation and which arises from the combination of the main radiation source/3×3 coupler/fiber coil and from the combination of the monitoring light source/3×3 coupler, is separated again by so-called lock-in methods based on its different modulation frequencies. The evaluation of these signals is based on the concept that different variations, for example, in the coupling constants $\Delta K_{12}$ and $\Delta K_{13}$, which indicate an asymmetry of the coupling conditions, produce correspondingly different output signals from the two radiation detectors (4, 5 in FIG. 2) with the modulation frequency $f_M$ of the monitoring radiation source. Mutual changes in all coupling lengths L or coupling constants $K_{ij}$ are detected both by means of the combination of two monitoring diodes (7 and 16), according to German application P 38 05 904.5, as Well as by means of the change, equal in magnitude in this case, in the $f_M$ signals of the radiation detectors (4, 5).

BRIEF DESCRIPTION OF THE DRAWINGS

The invention will be described in greater detail in the following detailed description with reference to the drawings, in which.

DETAILED DESCRIPTION

Figure 1:
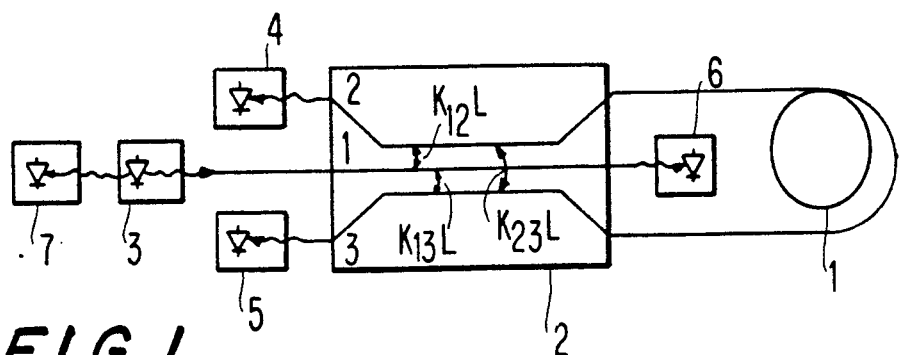
FIG. 1 shows an optical-fiber gyroscope according to German Application P 38 05 904.5.
Figure 2:
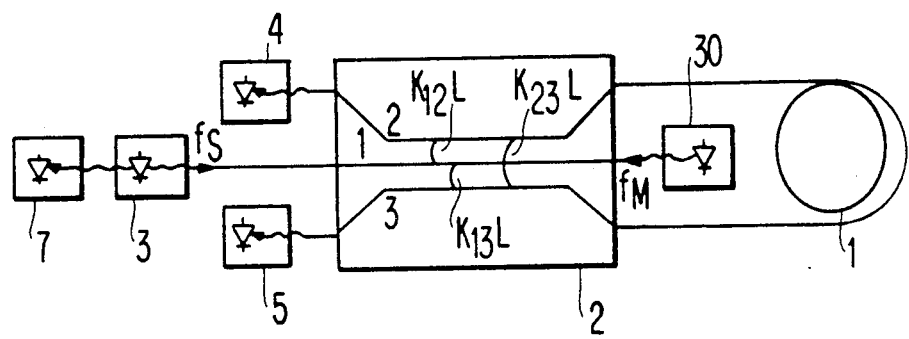
FIG. 2 shows an optical-fiber gyroscope with a monitoring light source.

In the case of the exemplified embodiment depicted in FIG. 2, the central channel 1 of a 3×3 coupler 2 communicates first of all with the main radiation source 3 and secondly with a monitoring light source 30. The main radiation source 3 is modulated with the so-called transmitting frequency $f_S$; the monitoring diode with a frequent $f_M$ which differs from the frequency $f_S$. The radiation intensity of the main radiation source 3 is detected directly by a monitoring diode 7. The radiation detectors 4 and 5, which communicate with the channels 2 and 3 of the 3×3 coupler 2, detect first of all the interference signals from the light signals counter propagating through the optical fiber coil 1, as well as the signals of the monitoring light source 30 spilling over out of the central channel as the result of coupling.

Figure 3:
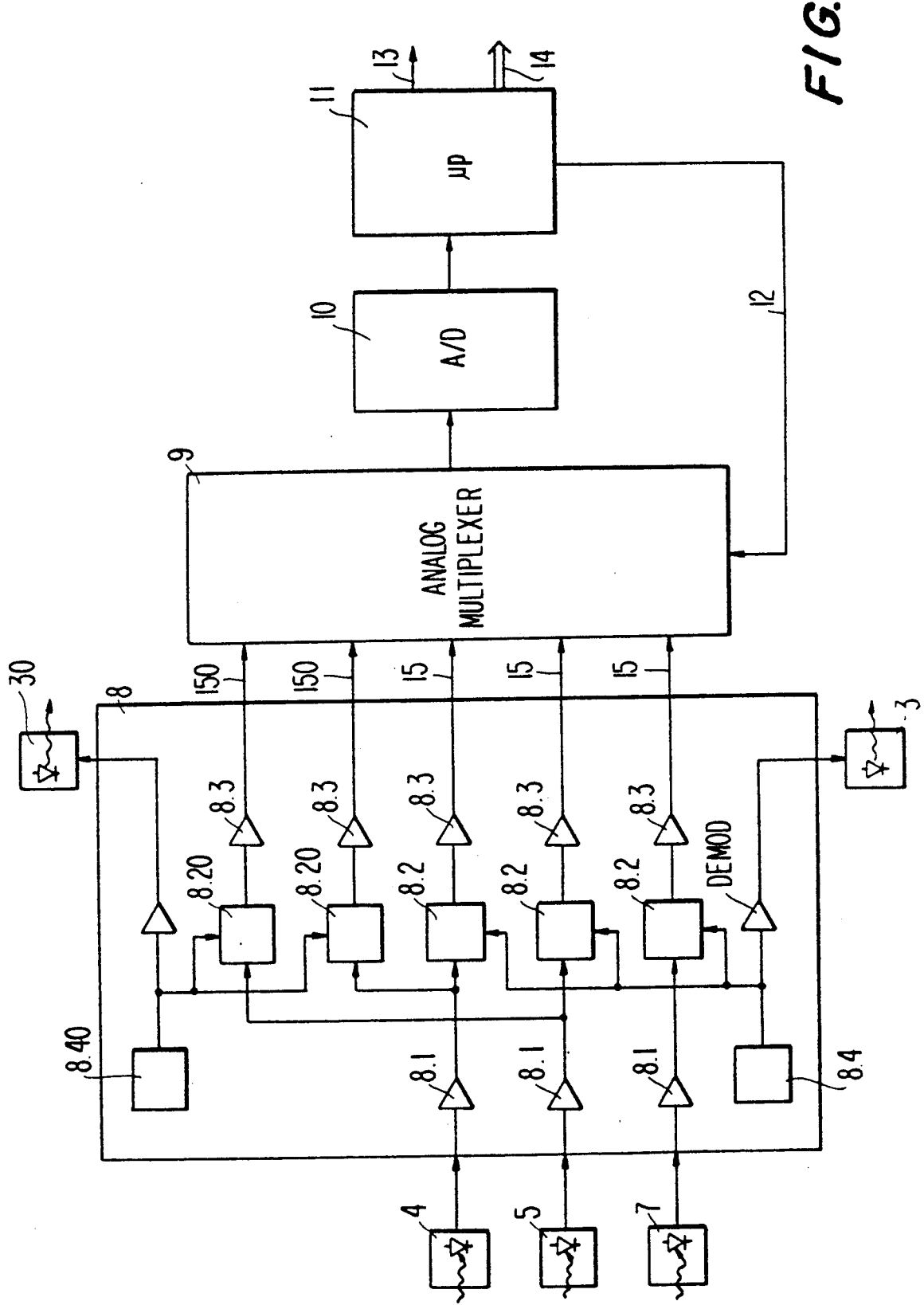
FIG. 3 shows a block diagram for evaluating the signals of an optical-fiber gyroscope according to FIG. 2.

The evaluation of the signals generated in the radiation detectors 4, 5 and 7 is achieved by means of the electronics depicted in FIG.3, whereby the radiation detectors 4, 5 and 7 are connected to a system 8 of so-called lock-in amplifiers. There, the individual signals are amplified by preamplifiers 8.1 and demodulated in correct phase relation by demodulators 8.2. An oscillator 8.4 thereby supplies the reference frequency $f_S$ for modulating the main radiation source 3, as well as for the 8.2.

Signals are tapped off the amplified signals of the radiation detectors 4 and 5 from the demodulators 8.2 and supplied to further 8.20, which take their reference frequency from an oscillator 8.40, which also modulates the monitoring light source 30. The thus resulting monitoring signals 150 are consequently separated from the signals 15, which were developed on the basis of the transmitting frequency $f_S$.

The signals filtered by a low-pass filter (not shown) of all demodulators 8.2 and 8.20 are amplified in further amplifiers 8.3 to a corresponding level and adapted to the impedance of a subsequent analog multiplexer 9. This analog multiplexer 9 multiplexes the output signals in the time interval that is controlled by the clock frequency 12 of a microprocessor or computer 11. The resulting time-multiplexed signals are converted in an analog-digital converter 10 into digital signals, which are processed further by the computer 11.

The gyroscope computer 11 determines the Sagnac phase $\phi_S$ from the interference signals $S_4$ and $S_5$ of the radiation detectors 4 and 5 according to $$S_4 = V \cdot [A + k \cdot B \cdot \cos(\phi_S + C)] \cdot J$$

$$S_5 = V \cdot [A + k \cdot B \cdot \cos(\phi_S - C)] \cdot J$$

A, B and C are variables which essentially comprise the coupling coefficients. The exact correlation is described in *Fiberoptic Gyroscope with [3×3]Directional Coupler*, S.K. Sheen, Appl. Phys. Lett. 37, 869-871 (1981), (cited in U.S. Pat. No. 4,440,498).

V = conversion factor of the radiation detectors
J = intensity of the light source.

Changes in the coupling coefficients, as they are recognizable by means of the monitoring signals 150, thus enter directly into the above coefficients A, B and C.

The detected Sagnac phase, and the rate of rotation derived from it, are delivered, respectively, via a serial output 13, and a parallel output 14. Additional information concerning the light output and the state of the coupler may also be included.

Figure 4:
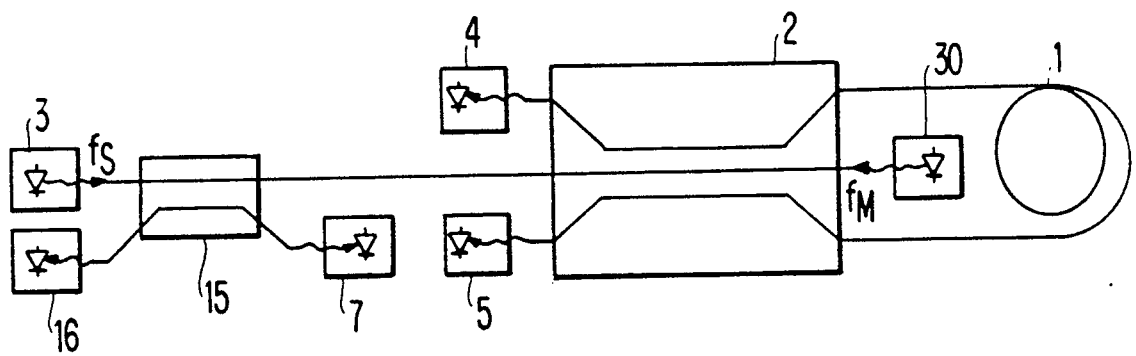
FIG. 4 shows an optical-fiber gyroscope with a monitoring light source and two monitoring diodes.

Generally, the monitoring diodes can be integrated in the transmitting diodes; if this is not the case, then one can compensate for this by installing a 2×2 coupler 15. As FIG. 4 shows, the monitoring diode 7 is mounted at the output of the coupler 15 on the coil side and fulfills the same task as in FIG. 2.

An additionally mounted radiation detector 16 supplies a signal, which contains the Sagnac phase in the portion varying by $f_S$ (with that, for example, the redundancy of the optical-fiber gyroscope can be increased), and allows a determination of the additional attenuation appearing in the coupler by evaluating the portion varying by $f_M$.

In the foregoing specification, the invention has been described with reference to specific exemplary embodiments thereof. It will, however, be evident that various modifications and changes may be made there unto without departing from the broader spirit and scope of the invention as set forth in the appended claims. The specification and drawings are, accordingly, to be regarded in an illustrative rather than in a restrictive sense.

What is claimed is:

1. An optical-fiber gyroscope of the Sagnac type having an optical fiber coil and a 3×3 coupler comprising three optically coupled fiber optic guides, whereby a first fiber optic guide of the 3×3 coupler is coupled at one end to a first optical radiation source, the radiation intensity of the radiation source being detected directly by a radiation detector, the two other fiber optic guides of the 3×3 coupler each being coupled at one end thereof to respective ends of an optical fiber coil and, at the other ends of each of the two other fiber optic guides, to respective radiation detectors, the first fiber optic guide of the 3×3 coupler being coupled to a second optical radiation source, which is modulated by a frequency which differs from the modulation frequency of the first radiation source.

2. The optical-fiber gyrosc recited in claim 1, wherein the first radiation source is to at least one further radiation detector.

3. The optical-fiber gyroscope recited in claim 2, wherein the first radiation source is directly to at least one further radiation detector.

4. The optical-fiber gyroscope recited in claim 2, wherein the first radiation source i indirectly to at least one further radiation detector.

5. The optical-fiber gyroscope recited in claim 1, wherein the radiation detectors are co to a system of lock-in amplifiers, in which the signals attributable to the first radiate separated from the signals which are attributable to splitting of the light from the second radiation source coupled on the reverse side into the fiber optic guide.

* * * * *

UNITED STATES PATENT AND TRADEMARK OFFICE
CERTIFICATE OF CORRECTION

PATENT NO. : 5,037,204
DATED : AUG. 6, 1991
INVENTOR(S) : POISEL ET AL.

It is certified that error appears in the above-indentified patent and that said Letters Patent is hereby corrected as shown below:

In column 1, line 18, change "quad-rant" to -- quad-rature --;

line 17, change "Which" to -- which --;

In column 2, line 22, change "Well" to -- well --;

line 48, change "frequent" to -- frequency --;

line 53, change "counter prop-agating" to -- counterprop-agating --;

line 67, change "...off the..." to -- ...off from the... --;

line 68, change "...5 from" to -- 5 upstream from... --;

Column 3, line 1 change "further" to -- further demodulators --;

Column 4, line 36 change "is" to -- is coupled --;

line 39, change "i" to -- is coupled --;

UNITED STATES PATENT AND TRADEMARK OFFICE
CERTIFICATE OF CORRECTION

PATENT NO. : 5,037,204
DATED : AUG. 6, 1991
INVENTOR(S) : POISEL ET AL.

It is certified that error appears in the above-indentified patent and that said Letters Patent is hereby corrected as shown below:

Colunn 4, line 42, change "co" to -- coupled --;

line 44, change "radiate" to -- radiation source are --.

Signed and Sealed this

Twenty-eight Day of March, 1995

Attest:

BRUCE LEHMAN

*Attesting Officer*     *Commissioner of Patents and Trademarks*